United States Patent [19]

Assaf

[11] Patent Number: 4,685,617

[45] Date of Patent: Aug. 11, 1987

[54] METHOD OF AND APPARATUS FOR CONDITIONING AIR IN ENCLOSURES

[75] Inventor: Gad Assaf, Rehovot, Israel

[73] Assignee: Geophysical Engineering Company, Wilmington, Del.

[21] Appl. No.: 762,859

[22] Filed: Aug. 6, 1985

[51] Int. Cl.$^4$ .............................................. F25D 17/06
[52] U.S. Cl. ........................................ 237/81; 62/93; 62/271; 165/909
[58] Field of Search ................ 62/93, 94, 96, 92, 271; 237/81, 56; 165/909

[56] References Cited

U.S. PATENT DOCUMENTS 2,667,766 2/1954 Cummings .......................... 62/94 X Primary Examiner—Henry A. Bennet
Attorney, Agent, or Firm—Sandler & Greenblum

[57] ABSTRACT

A system for conditioning the air in an enclosure, such as a greenhouse, uses low grade heat contained in a liquid, e.g., condenser cooling water that is normally discharged downstream of a power plant. The system includes an indirect contact heat exchanger with a heat exchange surface having one side contacted by the fluid, and a direct contact air-brine heat exchanger associated with the enclosure including a blower for exchanging air between the enclosure and the air-brine heat exchanger. The system also includes a pump for exchanging brine between the direct contact heat exchanger and the other side of the heat exchange surface of said indirect contact heat exchanger. Thus, an efficient indirect, liquid-to-liquid heat exchange operation takes place between the brine and the low grade heated liquid; and an efficient direct, air-brine heat exchange operation takes place to heat the air in the enclosure without increasing its humidity.

17 Claims, 4 Drawing Figures

METHOD OF AND APPARATUS FOR CONDITIONING AIR IN ENCLOSURES

TECHNICAL FIELD

This invention relates to a method of and apparatus for conditioning air in an enclosure, and more particularly to heating and controlling the humidity in an enclosure such as a greenhouse.

BACKGROUND OF THE INVENTION

In industrialized, less temperate regions of the world, consideration has been given to techniques that would utilize the tremendous amount of low grade heat produced by conventional and nuclear power plants. Such low grade heat is contained in the cooling water supplied to the condensers of the power plants. Conventionally, river water is used as the heat sink of industrial power plants, and its temperature is raised, typically 5°-10° C., in the condenser system before the water is discharged downstream. Usually, the incremental heat added to the cooling water is wasted. Thus, although enormous amounts of heat are present in the discharge condenser cooling water, its low temperature, typically 15°-30° C., militates against its efficient utilization.

Using waste heat in a fluid, e.g., condenser cooling water whose thermal head is about 10° C. or less, for industrial or residential heating purposes requires very efficient heat transfer equipment. One approach is to use a direct contact air-water heat exchanger located in an enclosure, e.g., a greenhouse. This will provide a very efficient transfer of heat from the condenser cooling water to the air in the greenhouse, but with an accompanying large increase in humidity within the greenhouse. Almost without exception, this approach will increase the humidity to a level that is unsuitable for plant growth, and uncomfortable or unhealthy for human habitation. Humidity can be controlled, however, and the heat contained in the low temperature fluid can be transferred to the air in a greenhouse by utilizing an indirect air-water heat exchanger, e.g., a shell and tube heat exchanger, located in the greenhouse. In this arrangement, condenser water flows through finned tubes over which forced air from the enclosure is blown. This approach to enclosure heating requires heat exchangers with large heat exchange surfaces because of the small thermal head involved, and requires the expenditure of large amounts of power to drive blowers for circulating air over the finned tubes with a velocity large to effect efficient heat transfer. Thus, size, complexity, and cost detrimentally affect the practicality of this approach to utilizing waste heat.

It is therefore an object of the present invention to provide a new and improved method of and apparatus for conditioning air in an enclosure which permits a reduction in physical size of the components, is more energy efficient, and yet permits both the humidity and temperature of the air in the enclosure to be maintained at predetermined levels.

BRIEF DESCRIPTION OF INVENTION

According to the present invention, the air in an enclosure is conditioned using low grade heat contained in a liquid by providing an indirect contact heat exchanger having heat exchange surface means contacted by the fluid on one side. The system of the present invention also includes a direct contact air-brine heat exchanger in association with the enclosure including means for exchanging air between the enclosure and the air brine heat exchanger. Finally, means are provided for exchanging brine between the direct contact heat exchanger and the other side of the heat exchange surface means of the indirect contact heat exchanger.

In the manner described above, low grade heat in the liquid, such as the condenser cooling water of a power plant, is first transferred by indirect contact with brine in an indirect contact heat exchanger. This fluid-to-fluid transfer of heat is many times for efficient than the transfer of heat in a fluid-to-air indirect heat exchange process. Having efficiently transferred heat from the condenser cooling water to the brine of the direct contact air-brine heat exchanger, the warmed brine can then be directly contacted with the air in the enclosure permitting the warmed brine to give up its sensible heat to the air in the enclosure, and, at the same time, permitting both the temperature and the humidity in the enclosure to be closely controlled by establishing the concentration of the brine. In situations where the contents of the enclosure do not introduce a significant amount of water vapor into the air, choosing the appropriate brine concentration will automatically maintain the air in the enclosure at any required humidity level as heating is achieved. In circumstances where the contents of the enclosure introduce water vapor into the air, such as when the enclosure is a greenhouse, water vapor can be removed from the enclosure either by ventilation, which introduces a loss of energy into the system, or by utilizing a brine concentration system of the type disclosed in co-pending U.S. patent applications Ser. No. 479,009 filed Mar. 23, 1983, or Ser. No. 600,882, filed Apr. 16, 1984, the disclosures of which are hereby incorporated by reference.

Alternatively, brine diluted during the conditioning process in the enclosure can be concentrated using an external direct contact air-brine heat exchanger exposed to ambient air. In this case, the heat required for evaporating water from the dilute brine can be derived from the low grade heat available from the liquid which is used to provide heat for heating the enclosure.

BRIEF DESCRIPTION OF THE DRAWINGS

Embodiments of the present invention are disclosed in the accompanying drawings wherein.

DETAILED DESCRIPTION

Figure 1:
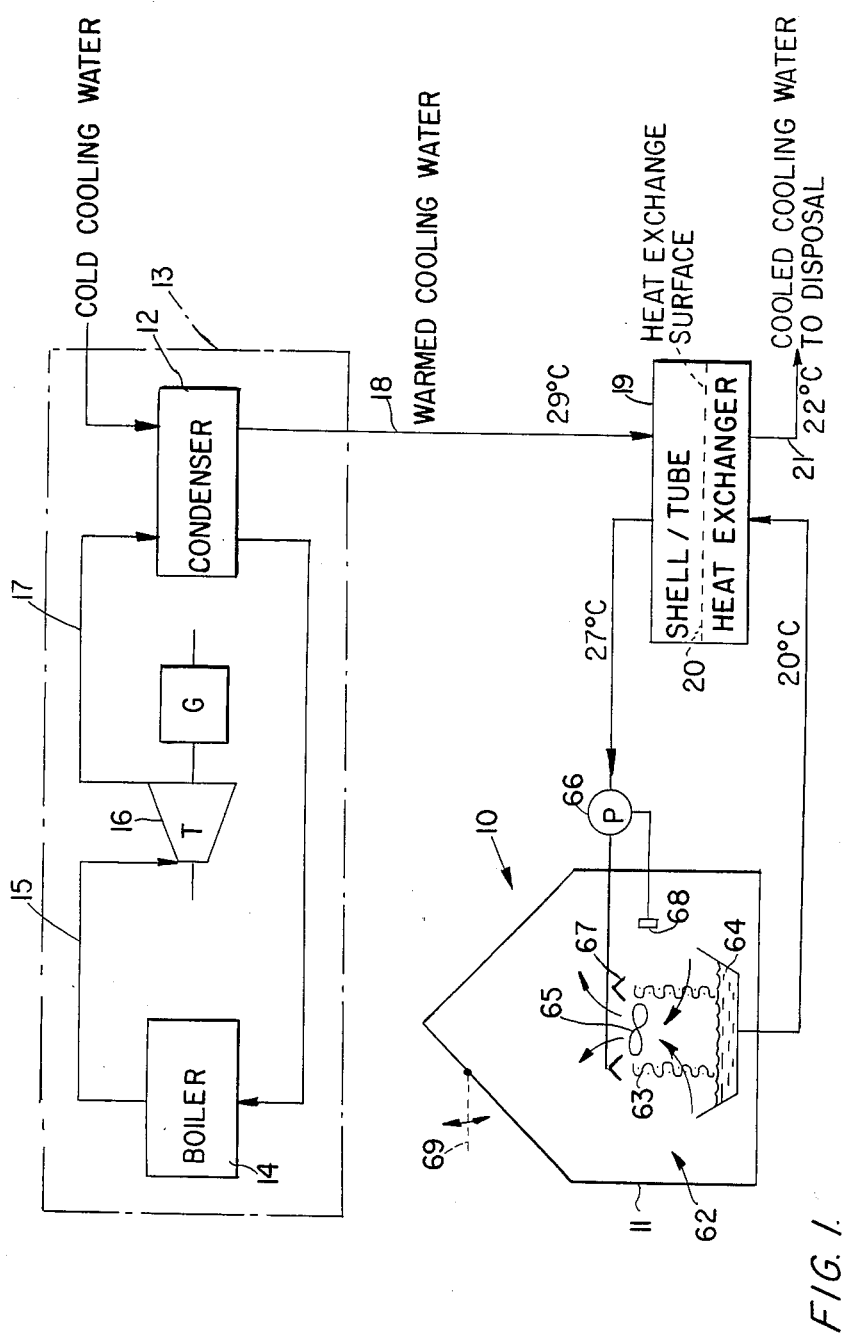
FIG. 1 is a block diagram of a first embodiment of the present invention.

Referring now to FIG. 1, reference numeral 10 designates apparatus according to the present invention suitable for conditioning the air in enclosure 11 using low grade heat contained in the condenser cooling water produced by condenser 12 of power plant 13. The power plant includes boiler 14 for vaporizing an operating fluid which is transferred by piping 15 to turbine 16 of a turbo-generator which produces electrical power. Heat depleted vapor from turbine 16 is transferred by piping 17 to condenser 12 where condensation takes place; and the condensate is then returned to the boiler for repeating the cycle.

Condenser 12 is, typically, a sheet and tube heat exchanger, to the cold side of which is applied cold cooling water from a source such as a river. After passing through the condenser and being warmed, the cooling water is applied by pipe 18 to indirect contact heat exchanger 19 having heat exchanger surface means 20 contacted by the warmed cooling water on the one side of the heat exchange surface. Preferably, heat exchanger 19 is a shell/tube heat exchanger. After passing through heat exchanger 19, the warmed cooling water gives up heat across the heat exchange surface, is cooled, and is then removed by pipe 21 and disposed of, for example, by downstream discharge to the river that was the source for the cold water supplied to condenser 12.

In addition to heat exchanger 19, apparatus 10, according to the present invention, includes direct contact air-brine heat exchanger 62 associated with enclosure 11. Heat exchanger 62 comprises cylindrical, air-pervious shell 63 mounted above reservoir 64 containing concentrated brine. Blower 65 represents means for exchanging air between enclosure 11 and heat exchanger 62. That is to say, operation of blower 65 causes air inside the enclosure to pass radially inwardly through shell 63 and then up and outwardly back into the enclosure.

System 10, according to the present invention, further includes pump 66 whose operation is effective to exchange brine between reservoir 64 of heat exchanger 62 and the other side of heat exchanger surface 20 in the exchanger 19. That is to say, operation of pump 66 causes brine contained in reservoir 64 to be circulated through one side of heat exchanger 19, where the brine is heated, typically, from 20° C. to 27° C. as the condenser cooling water is cooled, typically, from 29° C. to 22° C., before being disposed of. Pump 66 draws the warmed brine from heat exchanger 19 to spray heads 67 located above shell 62 so that the warm brine flows downwardly over the shell in a film. The air forced by blower 65 through the interstices of the shell is warmed by the transfer of sensible heat from the liquid brine to the air. In addition, depending upon the circumstances and the nature of the air in enclosure 11, water vapor in the air will condense on the brine film thus extracting water vapor from the air and diluting the brine that falls into reservoir 64. The latent heat of condensation of the water vapor on the brine is captured by the brine and returned to the enclosure as pump 66 exchanges brine between reservoir 64 and heat exchanger 19.

If the contents of enclosure 11 do not introduce a significant amount of water vapor into the air in the enclosure, a steady state condition is soon reached determined by the temperature and relative humidity within the enclosure, and the concentration of the brine. For example, if the enclosure represents a residential dwelling or a commercial establishment, and if the average brine temperature is 23.5° C., a temperature of 18° C. and a relative humidity of 70% can be established within enclosure 11 by using an appropriate brine concentration.

Because the heat transfer effected in heat exchanger 19 is efficient between the condenser cooling water on one side of the heat exchanger and the cooled brine on the other side of the heat exchanger, the size of the heat exchanger is relatively small, at least as compared to an air/fluid indirect type of heat exchanger. Furthermore, heat exchanger 62, is also physically small and provides a particularly reliable way in which to transfer heat from a liquid into the air in an enclosure without increasing the humidity. For convenience purposes, thermostat 68 may be provided in enclosure 11 for connection to pump 66 thereby controlling the duration of operation of the pump in accordance with the temperature, and if necessary, the humidity, within enclosure 11.

Figure 3:
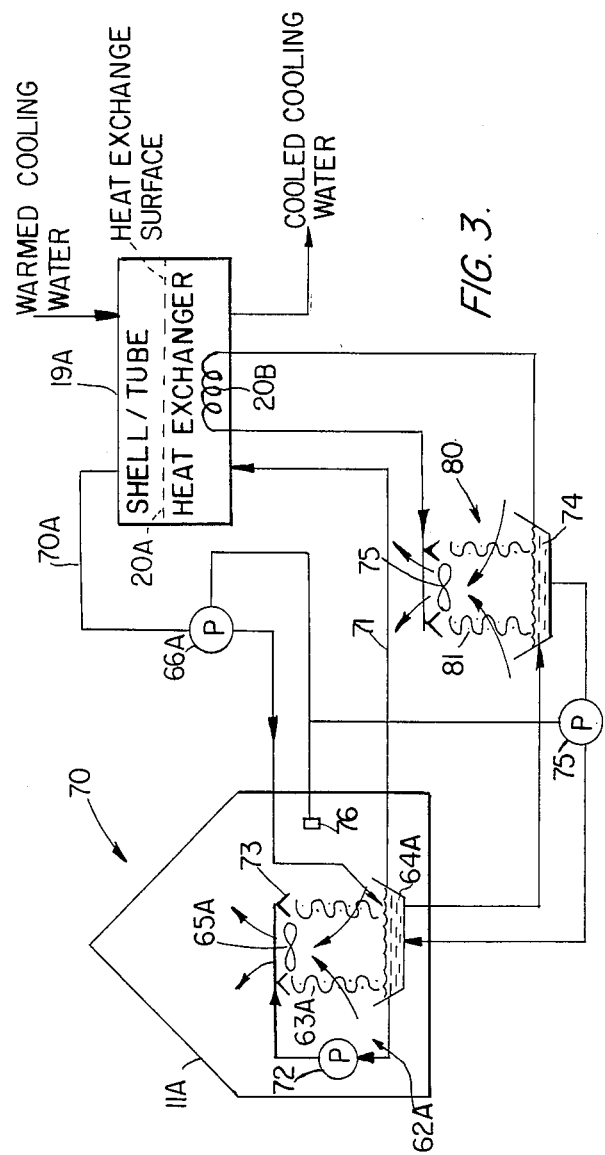
FIG. 3 is a second embodiment of the present invention.

In situations where the enclosure produces water vapor, such as when the enclosure is a greenhouse, two modifications can be made to maintain the humidity at a substantially constant level with time. In one modification, cold external air can be exchanged with the relatively warm humid air in enclosure 11. The other modification is shown in FIG. 3. Considering the first modification, which is shown in FIG. 1, selectively operable ventilator 69 controls the humidity within the enclosure. For example, if the external air temperature is about 6° C. with 100% relative humidity, the vapor to air ratio external to the greenhouse will be about 5 grams of vapor per kilogram of air. If the air in the greenhouse is at 18° C. with a relative humidity of 82%, the mixing ratio of the air in the enclosure is about 10.5 grams of vapor per kilogram of air. By exchanging one kilogram of air in the greenhouse with one Kg of external air, about 5.5 grams of water vapor per Kg of air will be removed. Thus, some 200 Kg of air will have to be exchanged in order to remove one Kg of vapor from the greenhouse. This technique is very simple but does consume power because the external air that replaces air in the greenhouse must be heated from ambient temperature to the temperature of the greenhouse. In the example discussed above, the 200 Kg of external air will have to be heated to 18° C. and this will take approximately 1.33 Kwh of energy. This represents the energy loss in utilizing an exchange of air in the greenhouse for controlling the humidity.

The embodimenmt shown in FIG. 3 may also be utilized for controlling the level of humidity within the enclosure. Referring now to FIG. 3, reference numeral 70 designates a second embodiment of the apparatus according to the present invention wherein enclosure 11a represents a greenhouse which contains plants whose transpiration during daylight hours utilizes carbon dioxide and produces water vapor. In the embodiment shown in FIG. 3, heat exhanger 19A is similar to that described above in connection with the first embodiment of the present invention. It is utilized for the purpose of transferring heat from the warmed cooling water from the condenser of a power plant to brine from a reservoir of brine. Specifically, heat exchanger 19A includes heat exchange surface 20A which separates the condenser cooling water from the brine, and auxiliary finned coil 20B over which the condenser water flows. The purpose of coil 20B is set forth below.

Heat exchanger 62A in apparatus 70 comprises air-impervious shell 63A mounted above brine reservoir 64A, and pump 66A whose operation exchanges brine between one side of heat exchanger 19A and reservoir 64A through piping 70A and 71, respectively. Brine from reservoir 64A is pumped by pump 72 to spray heads 73 located above shell 63A such that a thin film of brine flows downwardly over shell 63A into reservoir 64A. Blow 65A operates to exchange air between heat exchanger 62 and the interior of enclosure 11A. The apparatus described thus far is substantially the same as the apparatus described in connection with FIG. 1 except a variation is shown in FIG. 3 for the purpose of illustrating an alternative way to supply brine from the reservoir to the spray heads located above the air-pervious shell of the heat exchanger.

Inasmuch as enclosure 11A is representative of a greenhouse, the water vapor introduced into the greenhouse by the transpiration of the plants therein is removed by the air-brine direct contact heat exchanger 62A by the condensation of water vapor onto the brine as it flows downwardly over shell 63A into reservoir 64A. Thus, the brine is continuously diluted during the operation of the system.

In order to reconcentrate the brine and to remove an amount of water form the brine equal to the amount of water that has condensed on the brine due to the water vapor within the enclosure, a second air-brine heat exchanger is utilized. This second heat exchanger is indicated by reference numeral 80; and its construction is substantially the same as the construction of the heat exchanger 62A. That is to say, heat exchanger 80 includes air-pervious shell 81 suspended above brine reservoir 74. In this case, pump 75 controls the exchange of brine between reservoirs 64A and 74.

In operation, brine from reservoir 74 is circulated by a pump (not shown) through coil 20B in heat exchanger 19A and then is sprayed onto shell 81 in a thin film. The operation of blower 75 causes ambient air to flow through the interstices of shell 81 and to interact with the brine. The brine film on shell 81 is warmed by its passage through coil 20B, and the ambient air will evaporate water vapor from the brine film thus concentrating the brine at is falls into reservoir 74. In this manner, the heat required for evaporating water vapor removed from enclosure 11a is derived from the heat contained in the condenser cooling water passing through heat exchanger 19a. Again for convenience purposes, thermostat 76 may be provided for the purposes of controlling pump 66a and 75 thus controlling the temperature and humidity within enclosure 11A.

Figure 2:
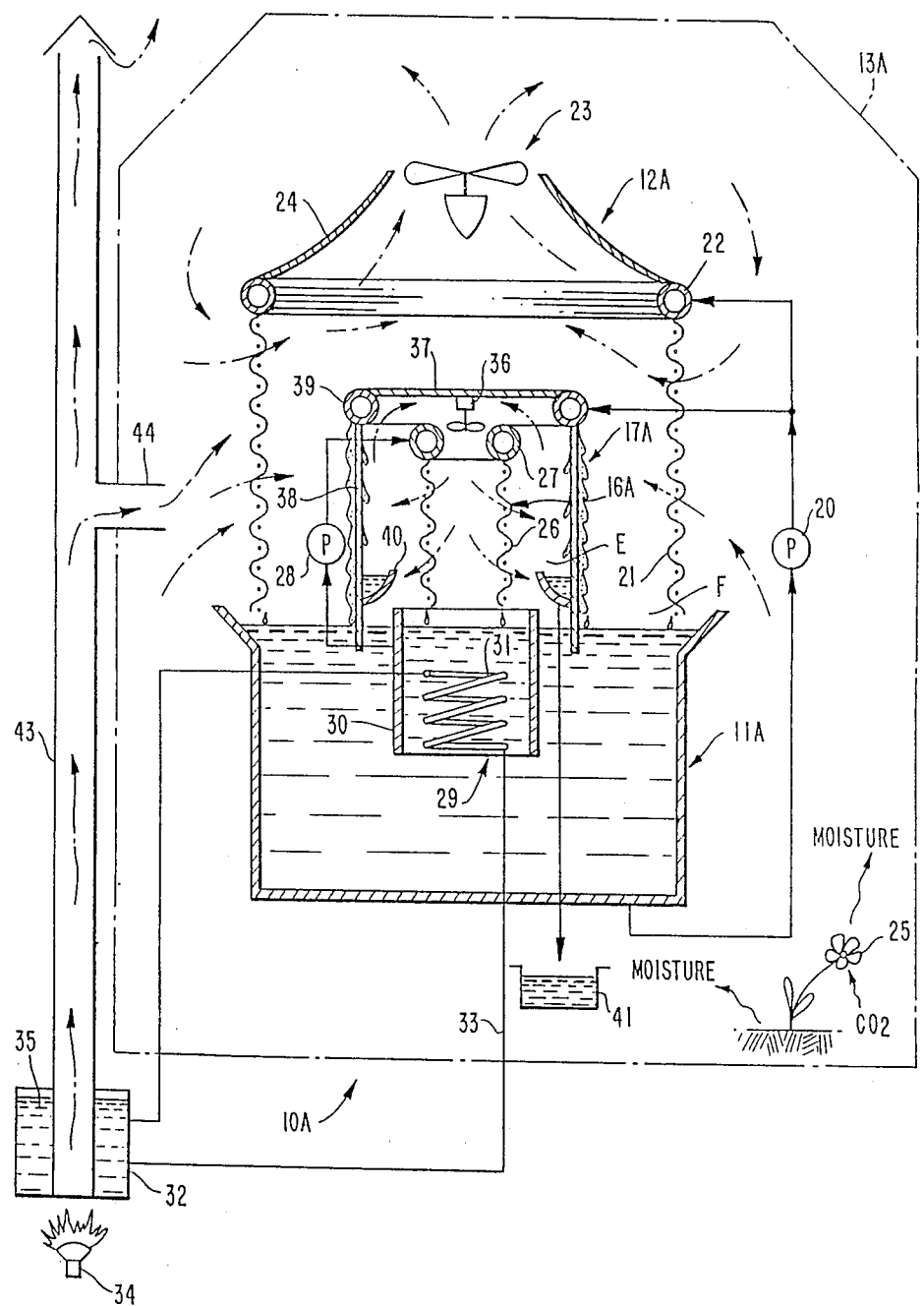
FIG. 2 is a cross-section through a direct contact air-brine heat exchanger into which an energy efficient brine reconcentrator is integrated.

Alternative to the arrangement shown in FIG. 3 for removing water vapor from the brine used for conditioning the air in the enclosure, an air-brine heat exchanger within the enclosure can take the form shown in FIG. 2 to which reference is now made in addition to the heat exchanger system 10A shown in FIG. 2 comprises direct contact, air-brine-vapor heat exchanger 12A located directly above reservoir 11A, brine contained in the reservoir being exchanged with the heat exchanger by means of pump 20. Heat exchanger 12A comprises a generally cylindrical porous member 21 supported from circular header 22 which itself is suitably supported within enclosure 13A. Member 21 may be in the form of a woven mat, or compressed fibrous material, for example. It will have almost no structural strength, but may be provided with a reenforcing cage (not shown) for maintaining its shape in the face of air flow which is described below.

Header 22 is, in effect, tubular and has apertures along its lower periphery for the purpose of providing a dripping type of flow path for concentrated brine that is supplied to the header by pump 20. The apertures in header 22 serve to meter the flow of brine to member 21 such that a thin film of brine flows downwardly on the member and drips into reservoir 11A. Motor driven fan 23, suitably supported in venturi mounting 24 attached to a header 22, serves as the primary air circulation system, and creates a circulation of air in enclosure 23 through member 21. As a consequence, air from the enclosure is drawn through member 21 such that the drawn air is contacted with the film of brine on member 21 and is dried thereby.

As shown schematically in FIG. 2, growing plants 25 in enclosure 13A, and soil and other material in the enclosure, produce moisture that is taken up in the air in the enclosure thus requiring the drying operation carried out by heat exchanger 12A. This drying operation is achieved by evaporator 16A which comprises generally cylindrical porous member 26 constructed much the same as member 21 of heat exchanger 12A. In addition, evaporator 16A includes header 27 in the form of a tube that is circular in shape and approximately the same size as the cylinder defined by member 26. Header 27 is tubular and is similar to tubular header 22 associated with the heat exchanger and likewise contains a series of holes for metering brine to member 26.

Brine is furnished to header 27 by pump 28 which is connected to segregated region 29 in reservoir 11A. Specifically, region 29 is defined by circular sleeve 30 which is concentric with the axis of heat exchanger 12A and evaporator 16A, and is suitable supported in the reservoir adjacent to the surface thereof. The top of this sleeve extends above the surface of the reservoir; and both the top and bottom are open. Brine within this segregated region is heated by heating coils 31 connected to boiler 32 by pipes 33. Burning of fuel by burner 34 heats water 35 contained within the boiler; and heated water is circulated through coils 31 locally heating the brine contained in segregated region 29 defined by sleeve 30.

Heated brine from the segregated region applied by pump 28 to header 27 exits therefrom through the small apertures in this header thus metering the flow of brine to member 26 such that a thin film of brine flows downwardly on member 26 and then drips into segregated region 29.

Finally, the system shown in FIG. 2 includes condenser of 17A in the form of heat conductive sleeve 38 which is concentric with and contained in the annular region between heat exchanger and evaporator members 21 and 26, respectively. The lower free end of this sleeve is immersed in the brine of the reservoir. Header 39 supported above sleeve 38 is supplied with brine from reservoir 11A by pump 20, and delivers brine only to the outer surface of the sleeve. Such brine drains on the outer surface of the sleeve into the reservoir. Cover 37 affixed to header 39 closes the top of sleeve 38 and defines air chamber E separate from air chamber F which is constituted by the interior of heat exchanger 12A. Fan 36 affixed to cover 37 establishes a secondary air circulation system that exchanges air between evaporator 16A and condenser 17A. Thus, fan 36 pushes air from the interior of porous member 26 of the evaporator, through the member, and into the annular region defined by the porous member and sleeve 38 of the condenser. The brine flowing downwardly on porous member 26 is warmer than the air flowing through the member; and the result is that water in the brine is evaporated by the air whose temperature is also raised by the absorption of sensible heat from the brine. The relatively warm and moist air that exits from the vaporizer contacts the relatively cool walls of sleeve 38 causing condensation of vapor on the inner surface of the sleeve. Thus, much of the heat absorbed by the air in evaporating and concentrating the brine is transferred through sleeve 38 to the brine flowing downwardly on the exterior of sleeve 38. This heat is carried by the runoff from the sleeve into the reservoir where it eventually is returned to the enclosure through the return of brine to heat exchanger 12A.

Condensate on the inner surface of sleeve 38 flows downwardly and is collected in gutters 40 for transfer to condensate storage 41 via conduit 42. Brine that flows downwardly on the outer surface of sleeve 38 is returned to reservoir 11A as shown in FIG. 2. Concentrated brine dripping from member 26 into segregated region 29 is more dense than brine therein, and consequently sinks to the lower portion of the reservoir below segregated region 29 and becomes available for being transferred by pump 20 to heat exchanger 12A.

In order to supply additional heat to enclosure 13A and to supply the enclosure with excess carbon dioxide, needed for enhancing plant growth in the enclosure, flue gases produced by burner 34 are piped through stack 43 and vented by pipe 44 to the interior of the enclosure.

In operation, growing plants 25 and the soil in which the plants are growing produce moisture that is taken up by the air in the enclosure. The moisture is carried by the air in enclosure 13A through member 21 of heat exchanger 12A in direct contact with concentrated brine thus drying the air. The heat of condensation of the water extracted from the air is transferred to the diluted brine which is returned to the reservoir. Air, in a conduit separate from the air exchanged between the enclosure and the heat exchanger for drying and warming the air in the enclosure, is exchanged between the vaporizer and the condenser. This air absorbs water from the warm brine inputted to the vaporizer producing concentrated brine; and the vapor in the air is condensed in the condenser transferring heat to brine circulated through the condenser out of direct contact with the air. The heat of vaporization added to the air to concentrate the brine is recovered by the brine and returned to the enclosure.

Figure 4:
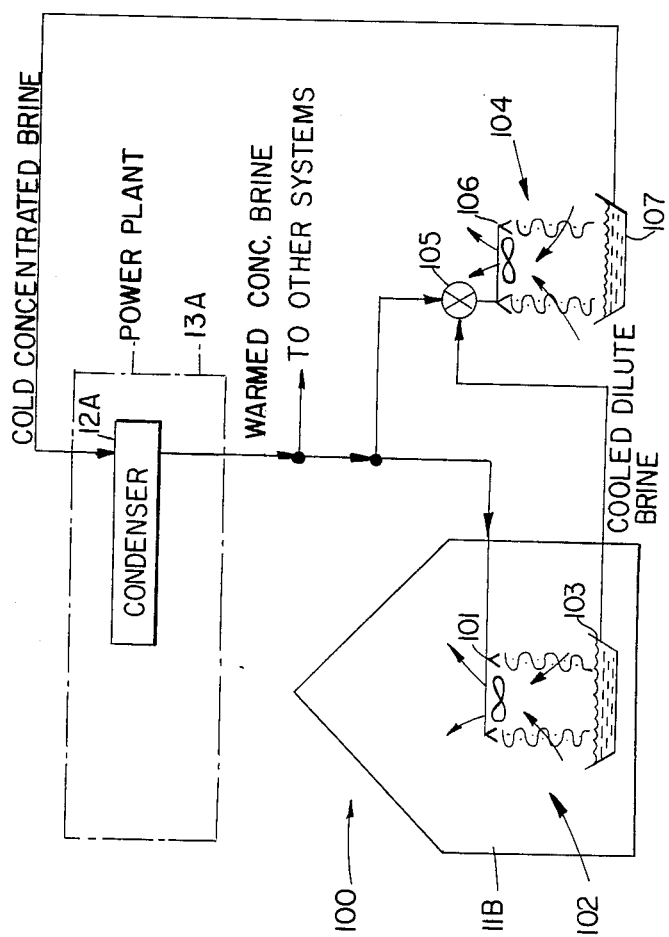
FIG. 4 is a further embodiment of the present invention wherein the coolant for the condenser of the power plant is concentrated brine.

A third embodiment 100 of the present invention is shown in FIG. 4 wherein the coolant for the condenser of the power plant is cold, concentrated brine. In embodiment 100, condenser 12A of power plant 13A is supplied with cold concentrated brine; and the warmed concentrated brine produced by the condenser is supplied directly to sprayheads 102 located within enclosure 11B. In this manner, the enclosure is warmed by the transfer of sensible heat from the warmed brine to the air in the enclosure. Where the enclosure is of the type that produces little or no moisture, the cooled brine collected by reservoir 103 will be of essentially the same concentration as the brine supplied to sprayheads 101. In such case, the brine from reservoir 103 may be returned to the inlet of condenser 12A, and the cycle repeated. This arrangement eliminates the indirect contact shell/tube heat exchangers 20 and 20A previously described.

When the enclosure is of the type that causes water vapor to be introduced into the air in the enclosure, the brine contacted by the air in the enclosure is diluted as it is cooled in the manner described above in connection with the embodiment of FIG. 3. In order to reconcentrate the diluted brine thus produced, an arrangement like that shown in FIG. 3 can be used. Alternatively, the dilute brine can be reconcentrated in direct contact air-brine heat exchanger 104 that operates much like heat exchanger 80 in FIG. 3. That is to say, the cooled and diluted brine is mixed at 105 with warmed concentrated brine produced by condenser 12A and sprayed into ambient air by spray heads 106. The mixture of brines is exposed to ambient air cooling the mixture and allowing water in the brines to be evaporated; and the concentrated brine falls into reservoir 107 before being returned to condenser 12A where the process is repeated.

The advantages and improved results obtained by the method and apparatus of the present invention are apparent from the foregoing description of the different embodiments of the invention. Various changes and modifications may be made without departing from the spirit and scope of the invention as described in the claims that follow.

What is claimed is:

1. A system for heating the air in an enclosure using low grade heat contained in a liquid whose temperature exceeds the temperature of the air in the enclosure comprising:
    (a) an indirect contact heat exchanger having heat exchange surface means contacted by said liquid on the one side, and contacted by brine on the other side for effecting the transfer heat from said liquid to the said brine;
    (b) a direct contact air brine heat exchanger associated with the enclosure including means for exchanging air between the enclosure and the air-brine heat exchanger; and
    (c) means for exhanging brine between said direct contact heat exchanger and the other side of the heat exchange surface means of said indirect contact heat exchanger.

2. A system according to claim 1 including means for maintaining a predetermined temperature and humidity in the enclosure.

3. A system according to claim 1 including means for concentrating the brine used in said air-brine heat exchanger.

4. A system according to claim 3 wherein said means for concentrating the brine includes means for heating said brine using heat derived from said fluid.

5. A system according to claim 3 wherein said indirect contact heat exchanger comprises a secondary heat exchange surface contacted by said fluid on one side, and including means for contacting the other side of said second heat exchanger surface with brine.

6. A system according to claim 5 wherein said means for contacting the other side of said second heat exchange surface includes a second direct contact air-brine heat exchanger, and means for exchanging brine between the two air-brine heat exchangers, and between the secondary heat exchange surface and the second direct contact air-brine heat exchanger.

7. A method for heating the air in an enclosure using low grade heat contained in a liquid whose temperature exceeds the temperature of the air in the enclosure comprising the steps of:
    (a) transferring heat in said liquid to brine by indirect contact; and
    (b) transferring heat and water between air in said enclosure and said brine in a direct contact air-brine heat exchanger to produce dilute brine and to warm the air.

8. A method according to claim 7 including the step of reconcentrating the dilute brine using heat contained in said liquid.

9. A method according to claim 8 including the step of transferring heat in said liquid to the dilute brine by indirect contact for producing heated diluted brine, and transferring heat and water between air outside said enclosure and said heated dilute brine in a direct contact air-brine heat exchanger to produce more concentrated brine, and returning the more concentrated brine to the first mentioned direct contact air-brine heat exchanger.

10. The method according to claim 9 including the steps of controlling the concentration in flow rates of the brine in accordance with the desired level of temperature and humidity in said enclosure.

11. An apparatus comprising:
(a) a source of liquid at a temperature below about 4° C.;
(b) an indirect contact heat exchanger to which said liquid is applied;
(c) a reservoir brine;
(d) means for exchanging brine between said reservoir and said indirect contact heat exchanger and for effecting the transfer of heat from said liquid to said brine;
(e) a direct contact air-brine heat exchanger constructed and arranged to exchange air with an enclosure; and
(f) means for exchanging brine between said reservoir and said direct contact air-brine heat exchanger.

12. Apparatus according to claim 11 including:
(a) a second direct contact air-brine heat exchanger exposed to ambient air;
(b) a second reservoir of brine;
(c) means for exchanging brine between said second reservoir and said indirect heat exchanger; and
(d) means for exchanging brine between the first reservoir and said second reservoir.

13. An apparatus according to claim 11 including means for controlling the concentration of brine in said first reservoir for establishing a predetermined temperature and humidity in said enclosure.

14. Apparatus according to claim 11 wherein said direct contact, air-brine heat exchanger includes a cylindrical air-pervious shell mounted above said reservoir, means for supplying brine to said shell over which the brine flows as a film and a blower for drawing air from the enclosure through said shell.

15. A method for conditioning air in an enclosure using low grade heat contained in coolant produced by the condenser of a power plant comprising transferring heat in said coolant to air in said enclosure without adding water vapor to the air in the enclosure.

16. A method according to claim 15 including the steps of utilizing concentrated brine as the coolant for the condenser, and supplying said coolant to a direct-contact air-brine heat exchanger associated with the enclosure for effecting the transfer of sensible heat in said coolant to the air in the enclosure.

17. A method according to claim 16 including the steps of reconcentrating cooled coolant produced by said direct-contact heat exchanger, and supplying the reconcentrated coolant to the condenser.

* * * * *

UNITED STATES PATENT AND TRADEMARK OFFICE
CERTIFICATE OF CORRECTION

PATENT NO. : 4,685,617

DATED : August 11, 1987

INVENTOR(S) : Gad ASSAF

It is certified that error appears in the above-identified patent and that said Letters Patent is hereby corrected as shown below:

```
Column 3, line 40, change "62" to ---63---.
Column 4, line 65, change "blow" to ---Blower---.
Column 5, line 14, change "form" to ---from---;
          line 34, change "11a" to ---11A---;
          line 36, change "19a" to ---19A---;
          line 38, change "66a" to ---66A---;   and
          line 44, change "made in" to ---made. In---.
Column 6, line 22, change "suitable" to ---suitably---.
Column 7, line 45, change "102" to ---101---.
Column 8, line 22, after "transfer", insert ---of---;
          line 40, change "fluid" to ---liquid---; and
          line 43, change "fluid" to ---liquid---.
Column 9, line 7, change "in" to ---and---;
          line 11, change "4°" to ---40°---;   and
          line 16, after "reservoir", insert ---of---.
```

Signed and Sealed this

Twenty-sixth Day of April, 1988

*Attest:*

DONALD J. QUIGG

*Attesting Officer*   *Commissioner of Patents and Trademarks*